United States Patent [19]

Yepis

[11] 3,850,466

[45] Nov. 26, 1974

[54] VEHICLE BUMPER AND FRAME MOUNTING

[76] Inventor: Alfonso F. Yepis, 231 Garrett Ave., Chula Vista, Calif. 92010

[22] Filed: Aug. 14, 1972

[21] Appl. No.: 280,453

[52] U.S. Cl................................. 293/89, 293/99
[51] Int. Cl............................................. B60r 19/04
[58] Field of Search ............ 293/70, 63, 84, 89, 96, 293/99, 60, 72, 71 R; 114/219

[56] References Cited
UNITED STATES PATENTS

| 1,187,841 | 6/1916 | Jelalian | 114/219 |
| 1,448,504 | 3/1923 | Plante | 293/84 |
| 1,467,640 | 9/1923 | Ilich | 293/72 |
| 1,547,793 | 7/1925 | Crell | 293/89 |
| 1,622,442 | 3/1927 | Guenther et al. | 293/71 R |
| 1,777,342 | 10/1930 | Williams | 293/84 |
| 1,954,776 | 4/1934 | Haynes | 293/89 |
| 2,058,283 | 10/1936 | Wolff | 293/84 |

FOREIGN PATENTS OR APPLICATIONS

| 643,811 | 9/1928 | France | 293/89 |

Primary Examiner—Lloyd L. King
Assistant Examiner—Robert Saifer
Attorney, Agent, or Firm—Ralph S. Branscomb

[57] ABSTRACT

A bumper and mounting means therefor on a chassis frame of an automotive vehicle, whereon the impact-receiving portion is mounted by hinge connections with brackets positionally generally transversely outwardly only, of the vehicle, without rupturing the mounting, but the inpact-receiving portion is in the shape of a section of an ellipse and quite resillient so on impact it will flex about one or both of its hinge connections with the support brackets and one or both of the brackets will shift, pivotally or slidably, relative to the chassis frame. However, the brackets are restrained from moving toward each other with the net result that flexing of the bumper is made possible while undue movement thereof transversely of the chassis frame is prevented.

2 Claims, 4 Drawing Figures

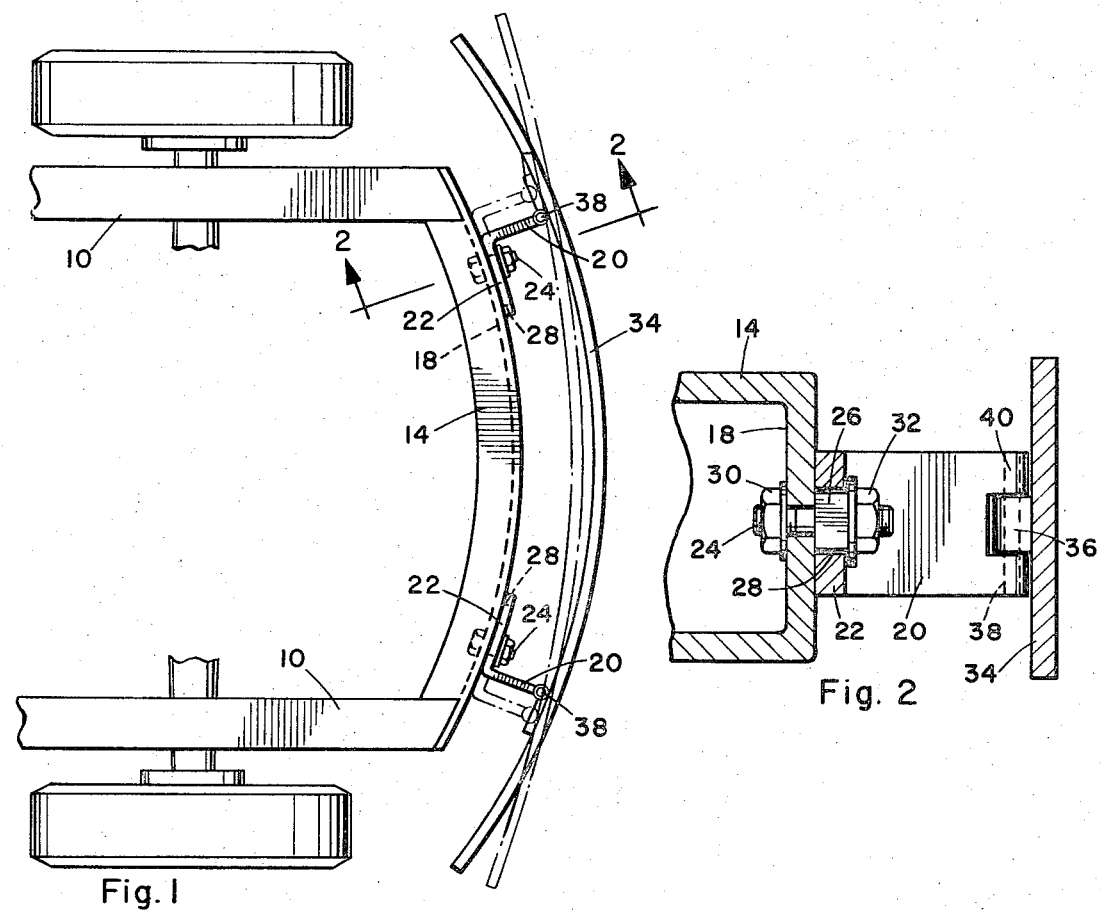
Fig. 1
Fig. 2
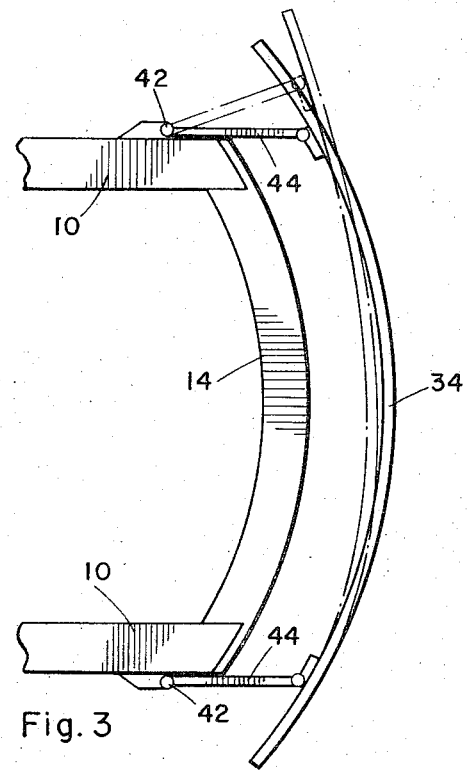
Fig. 3
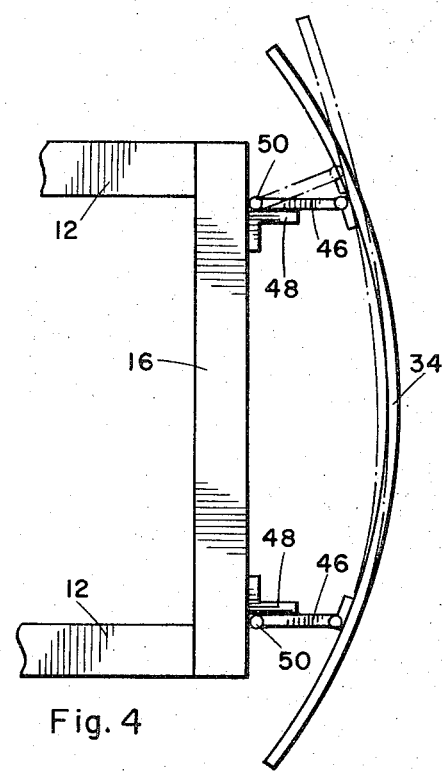
Fig. 4

VEHICLE BUMPER AND FRAME MOUNTING

BACKGROUND OF THE INVENTION

Bumpers in the past have usually been massive, relatively non-resilient and generally straight transversely of the vehicle, with however a great number of variations including wrap-around styles and separated bumperette styles. There is a need however, for a cross frame and bumper construction which will provide large impact absorption without permanent deformation, without lateral deflection of the whole bumper, short of rupture and demolition.

SUMMARY OF THE INVENTION

As claimed, the hereindefined bumper construction combined with vehicle chassis cross frame structure satisfies the need referred to immediately above and comprises at least one impact-receiving bar, definitely resilient and curving away from the end of the vehicle chassis, which latter may carry a cross frame member constituting a rigid backing and/or support for the bumper. The impact receiving bar is hingedly connected to brackets which are mounted on the vehicle chassis frame structure so as to be capable of individually moving, within limits, outwardly or away from the vertical center plane of the vehicle but neither bracket can shift toward the other so that the bumper is stabilized against undue lateral movement while being capable of flexing under a glancing impact load or a load applied near the center of the bumper.

BRIEF DESCRIPTION OF THE DRAWING

FIG. 1 is a top plan view of the bumper assembly installed on a somewhat diagrammatically illustrated automotive vehicle frame;

FIG. 2 is an enlarged sectional view taken on line 2—2 of FIG. 1;

FIG. 3 is a top plan view of an alternative bumper mounting; and

FIG. 4 is a top plan view of a similar bumper mounting applied to a straight terminal cross frame member.

DETAILED DESCRIPTION OF A PREFERRED EMBODIMENT

Referring now to the drawing, an automotive vehicle frame is fragmentarily and somewhat diagrammatically indicated as having side frame members 10 and 12 in FIGS. 1 and 3 and FIG. 4, respectively. These side frame members are usually heavy channel beams of great rigidity and terminal cross frame members arcuate as indicated at 14 or rectilinear as shown at 16, are likewise rigid strong metal members, usually welded to and between the adjacent pairs of end of the side frame members. Since the bumper structure is required at both front and rear of a vehicle, the illustrated structure may be thought of as duplicated front and rear and the cross frame structure will possibly therefore be referred to herein simply as the terminal cross frame structures or member.

In FIGs. 1 and 2 the terminal cross frame member 14 has a vertical wall 18 and the bumper support brackets 20, 20 have base flanges 22 which are slightly arcuate to correspond with the curvature of the wall 18, and are slotted to receive a heavy duty stud pin 24, threaded at each end and having a central base 26 which is accepted in the slot 28 of the flange 22. A nut 30, with a lock washer holds the stud pin in place and a second nut 32, with a lock washer, retains the flange 22 with limited capability of longitudinal slippage, that is, slippage longitudinally of the cross beam member 14 and generally transversely of the vehicle.

The bracket 20 has a hinge connection with the impact-receiving member 34 which can be effected in a variety of ways and is represented here as a boss 36 unitized with the member 34 and bored to receive a hinge pin 38 which also is received and held by opposed and aligned lugs 40 on the bracket 20. The impact-receiving member or bar 34 is curved, preferably as a section of an ellipse, and may be a single bar or a more complex assembly but in every case this member 34 is definitely resilient and, as illustrated in FIGS. 1 and 3, has a curvature substantially equivalent to and in the same sense as the curved terminal frame member 14. Upon flexure due to an impact applied more or less centrally of the member 34 both brackets 20 may move outwardly as indicated in dash line in FIG. 1, while glancing blows may require only one bracket to move. In either case the brackets are prevented from moving toward each other, except of course in the reestablishment of normal non-impact position thereof, and this feature assures stabilization of the bumper against undue movement as a whole transversely of the vehicle.

The invention as depicted in FIG. 3 is virtually identical in function except that the stabilization against undue transverse shifting is achieved by providing a one-way hinge connection 42 for the brackets in lieu of the sliding connection 22-26 described above. This hinge connection 42 is to the frame structure 10 and the brackets 44 while still hinged as before to the bar may be simplified as illustrated in FIG. 3. The one-way action in this instance is of course achieved by arranging the brackets 44 so that they engage the frame structure when urged to move in one direction. Each bracket is free to move in one direction. Each bracket is free to move in the other direction as indicated in dash line FIG. 3.

Finally, the terminal cross frame structure may be such as the member 16 in FiG. 4 and while this does not require an alteration in the bar 34, or a material change other than simple dimensioning in the bracket 46, the means to prevent undue lateral movement of the bumper may take the form of simple angle iron stops 48 welded to the terminal frame member 16 adjacent to the hinge connections 50 of the brackets 46. Operation of the bumper illustrated in FIG. 4 is again virtually identical to that illustrated in the other figures.

I claim:

1. Improvements in frame mountings for a vehicle bumper, comprising:

rigid parallel side frame structure including rigid frame members and terminal non-extensible cross frame structure between said side members as integral portions of the vehicle chassis;

a pair of support brackets each having a hinge for connection with said bumper and having slotted flanges with bolt elements extending through the slots of the slotted flanges and through said terminal cross frame structure on said frame structure permitting sliding movement of the brackets, under impact conditions, away from each other only, except in re-establishment of the normal non-impact positioning of the brackets.

2. Structure according to claim 1 wherein said terminal cross frame structure between said side frame members and said bumper are both arched away from the adjacent end of said parallel side frame structure.

* * * * *